United States Patent [19]

Gartland et al.

[11] Patent Number: 4,572,852

[45] Date of Patent: * Feb. 25, 1986

[54] THERMOFORMING PARTIALLY CRYSTALLINE POLYESTER ARTICLES

[75] Inventors: Robert J. Gartland, Youngstown; Joseph N. Feil, Akron, both of Ohio

[73] Assignee: The Goodyear Tire & Rubber Company, Akron, Ohio

[*] Notice: The portion of the term of this patent subsequent to Jul. 31, 2001 has been disclaimed.

[21] Appl. No.: 668,061

[22] Filed: Nov. 5, 1984

Related U.S. Application Data

[60] Continuation-in-part of Ser. No. 597,776, Apr. 6, 1984, which is a division of Ser. No. 409,219, Aug. 18, 1982, Pat. No. 4,463,121.

[51] Int. Cl.$^4$ .......................... B65D 1/00; B32B 27/36; C08K 5/09
[52] U.S. Cl. ...................................... 428/35; 428/480; 525/177
[58] Field of Search ................ 524/291, 108; 525/177; 428/480, 35

[56] References Cited

U.S. PATENT DOCUMENTS

| | | | |
|---|---|---|---|
| 3,285,855 | 11/1966 | Dexter et al. | 524/291 X |
| 3,644,482 | 2/1972 | Dexter et al. | 260/473 |
| 3,673,139 | 6/1972 | Hrach | 525/177 |
| 3,960,807 | 6/1976 | McTaggart | 260/40 |
| 3,987,004 | 10/1976 | Georgoudis | 524/108 |
| 3,989,664 | 11/1976 | Kawase et al. | 524/291 X |
| 4,046,837 | 9/1977 | Carroll, Jr. | 525/177 |
| 4,327,198 | 4/1982 | Weimes et al. | 525/177 X |
| 4,368,295 | 1/1983 | Newton et al. | 525/177 X |
| 4,463,121 | 7/1984 | Gartland et al. | 524/291 |

FOREIGN PATENT DOCUMENTS

| | | |
|---|---|---|
| 0078020 | 5/1983 | European Pat. Off. . |
| 1694198 | 10/1971 | Fed. Rep. of Germany . |
| 1195153 | 6/1970 | United Kingdom . |

*Primary Examiner*—Thomas J. Herbert
*Attorney, Agent, or Firm*—R. D. Thompson

[57] ABSTRACT

Thin walled thermoformed articles of partially crystallized polyethylene terephthalate containing a minor component of a polyolefin which exhibit improved impact resistance and high temperature dimensional stability are disclosed herein. A method for thermoforming such articles using polyethylene terephthalate/polyolefin blends which provides improved mold release is also revealed.

17 Claims, No Drawings

THERMOFORMING PARTIALLY CRYSTALLINE POLYESTER ARTICLES

This application is a continuation-in-part of Ser. No. 597,776, filed Apr. 6, 1984, which is a divisional of Ser. No. 409,219, filed on Aug. 18, 1982 (now issued as U.S. Pat. No. 4,463,121).

BACKGROUND OF THE INVENTION

This invention relates to the thermoforming of articles from polyethylene terephthalate modified with polyolefins. In particular, the invention describes a thermoforming process for making a partially crystalline, heat set article from high molecular weight polyethylene terephthalate modified with a polyolefin, thereby achieving an improved process exhibiting superior mold release, shorter cycle times and broader operating temperature ranges. The articles produced exhibit improved impact resistance and improved high temperature service life.

BACKGROUND ART

Polyethylene terephthalate (PET) is widely known as a polymer for the production of fibers, textiles and films. The excellent chemical resistance and low gas permeability characteristics of PET make it a desirable material for the production of articles in which such properties are critical. Much effort has been devoted to the use of PET in such applications as carbonated soft drink beverage bottles, mouth wash containers, blister packs for the packaging of meats, and polyester coated paperboard for food trays.

The wide-spread popularity of microwave ovens for home use has initiated interest in a polyester container for food which can be used in microwave or conventional ovens which can withstand oven temperatures near 200° C. This application is described as a dual-ovenable container and requires the container to withstand prolonged high temperature exposure without significant loss of impact strength or dimensional stability.

To achieve high temperature stability, a polyester in the crystalline state rather than the amorphous state is necessary. An unoriented polyethylene terephthalate container or article will undergo crystallization at elevated temperatures. The crystallites are formed bonds that are substantially stable up to near the melting point of the PET which is 252° C.

Injection molding and thermoforming are known methods for forming thermoplastic polyester articles. In injection molding, the polyester is heated above its melting point and injected under sufficient pressure to force the molten polyester to fill the mold cavity. The molten polyester is cooled in the mold until it is rigid enough to be removed. The injection molding method is not satisfactory for the production of thin walled articles, due to flow lines and layering which develop during the filling of the mold and lead to non-uniform properties, surface irregularities and warping of the finished article.

Thermoforming is another process known to be useable for the production of polyester articles. In thermoforming, a sheet of preformed polyester is preheated to a temperature sufficient to allow the deformation of the sheet. The sheet is then made to conform to the contours of the mold by such means as vacuum assist, air pressure assist, and matched mold assist. Unlike injection molding, thermoforming is a highly desirable method for producing thin wall containers.

The thermoforming of unmodified polyethylene terephthalate films and sheeting and heat treating in the heated mold to obtain crystallinity higher than 25 percent is known. This process has been found to be unsatisfactory for making high impact strength, thin walled articles in several important respects. The heat treatment step required 30 to 600 seconds, depending upon the temperature, in order to attain of the desired level of crystallinity. The molded, heattreated parts had a tendency to stick to the mold surface which led to deformation of the part during removal and to undesirable surface irregularities in the finished part. In addition, the impact resistance of the finished article was found to be inadequate for many applications.

Another known thermoforming process used polyethylene terephthalate sheet containing up to one part by weight of a crystallization initiator, having a median particle size of 1 to 5 microns. The preheated sheet was conformed to a mold and maintained in contact with the heated mold until an average crystallinity of at least 20% was achieved. This process improved the rate of crystallization compared to unmodified PET but it did not overcome the problems of mold sticking and inadequate impact strength of the finished article.

U.S. Pat. No. 3,960,807 teaches a process for thermoforming articles from a composition having three essential components: (1) A crystallizable polyester; (2) A crack stopping agent, preferably a polyolefin; (3) A nucleating agent. This process improved the impact resistance of the article, mold release and rate of crystallization compared to unmodified PET. We have surprisingly and unexpectedly found that the widely known and commonly used nucleating agent which were taught to be essential in U.S. Pat. No. 3,960,807 are completely unnecessary in the practice of this invention.

BRIEF DESCRIPTION OF THE INVENTION

This invention relates to polyester articles which are suitable for use at service temperatures near 200° C. This invention also relates to a process for manufacturing thin walled polyester articles which can be thermoformed and heat set in less than six seconds. This invention further relates to the use of improved polyester compositions to replace unmodified polyethylene terephthalate in thermoforming processes which give improved rates of crystallization, broader molding temperature ranges and superior mold release.

The invention is directed to a process for making a heat set, thin walled article comprising: thermoforming a substantially amorphous sheet consisting of from about 99 to about 90 weight percent polyethylene terephthalate with an intrinsic viscosity from about 0.65 to about 1.2; and from about 1 to about 10 weight percent of a polyolefin with repeat units derived from olefin monomers containing 2 to 6 carbon atoms, wherein said thermoforming is carried out in a heated mold for a time sufficient to achieve partial crystallization of said article. Another aspect of this invention incorporates from about 0.005 to about 2.0 weight percent of a heat stabilizer in the composition. Yet another aspect is the addition of a non-nucleating colorant in the composition. The invention is further directed to thermoformed, thin walled, heat set articles produced by these improved processes.

MORE DETAILED DESCRIPTION

In order to produce articles or containers usable in applications where high service temperatures are encountered, a polyester in the crystalline state rather than the amorphous state is necessary. Of the known thermoplastic, crystallizable polyesters, polyethylene therephthalate offers the desirable properties of good high temperature dimensional stability, chemical, oil and solvent resistance and the ability to pass microwave radiation without absorbing or reflecting it. These properties make it the polymer of choice for use in high temperature food containers.

The polyethylene terephthalate polymer is obtained by known polymerization techniques from either terephthalate acid or its lower alkyl ester (dimethyl terephthalate) and ethylene glycol. The terephthalic acid or dimethyl terephthalate is esterified or transesterified and then polycondensed with ethylene glycol to a high molecular weight product. For use in this invention the polyester so produced should have an intrinsic viscosity ranging from about 0.65 to about 1.2 and preferably from about 0.85 to about 1.0 as measured in a 60/40 by volume mixed solvent of phenol/tetrachloroethane at 30° C. Known methods of solid state polymerization may be employed to achieve the higher intrinsic viscosities.

In order to utilize polyethylene terephthalate in viable commercial forming processes such as thermoforming it is essential that the desired level of crystallinity be achieved in a very short cycle time. An acceptable cycle time would be 5 to 7 seconds. Polyethylene terephthalate polymer, completely unmodified, exhibits crystallization rates too slow to achieve the required cycle times. To overcome the slow crystallization rate, it is well known to add nucleating agents in order to increase the number of crystallites formed. Most known nucleating agents are inorganic materials having an average particle size of from 2 to 10 microns. Other known nucleating agents are carbonaceous materials such as carbon black and graphite. Common nucleating agents may be talc, gypsum, silica, calcium carbonate, alumina, titanium dioxide, pryophylite silicates, finely divided metals, powdered glass, carbon black, and graphite. The common feature shared by the foregoing list of known nucleating agents is that they exist in solid, form within the temperature range of 100° C. to 300° C. where polyesters are forming crystalline structures. It was quite unexpectedly found that in the practice of this invention nucleating agents of the type described above are completely unnecessary for the achievement of commercially viable thermoforming processes.

The second essential component in the practice of this invention is a polyolefin, which must be present with the polyethylene terephthalate. Polyolefins as used herein are those produced from olefin monomers having from 2 to 6 carbon atoms. The resulting polymer contains repeat units derived from the original monomer units. These repeat units differ from the monomers in that they no longer contain a carbon-carbon double bond. Such polymers include low density polyethylene, high density polyethylene, linear low density polyethylene, polypropylene, polyisopropylene, polybutene, polypentene, polymethylpentene. The polyolefin should be present in levels of from 1 to 10 weight percent of the total composition. A preferred range was found to be from 1 to about 8 weight percent. The most preferred range is 2 to 5 weight percent. A preferred class of polyolefins is the polyethylenes with the most preferred type being linear low density polyethylene, as represented by products marketed by Dow Chemical under the tradenames DOWLEX 2045 and 2035. When compared to unmodified PET, all the polyolefins provide improved impact strength in the finished article and improved mold release in the thermoforming process. The polyethylene and polypropylene have broader operating temperature ranges, faster rates of crystallization and lower temperatures for the onset of crystallinity. These improvements lead to faster cycle times, more parts per minute and a lower cost finished article.

The use of the polyolefins with the PET was found to give rates of crystallization at least as fast as compositions which contained both the polyolefin and an additional nucleating agent.

In another aspect of the invention, a heat stabilizer may be optionally added to the PET/polyolefin blend. This embodiment of the invention is of particular utility when the finished article will be subjected to high temperature service conditions for long periods of time. The retention of adequate physical properties, especially impact strength is very important in applications such as trays for use in conventional and microwave ovens. Heat stabilizers as used herein are compounds which demonstrate antioxidant properties, the most important of which is the capability of inhibiting oxidation. An effective heat stabilizer in the practice of this invention must be capable of protecting the thermoformed, heat set polyester article during exposure to elevated temperatures. U.S. Pat. No. 3,987,004, U.S. Pat. No. 3,904,578 and U.S. Pat. No, 3,644,482 disclose many examples of known heat stabilizers. The following compounds are representative of useful heat stabilizers in the practice of this invention: alkylated substituted phenols, bisphenols, substituted bis phenols, thiobisphenols, polyphenols, thiobisacrylates, aromatic amines, organic phosphines and polyphosphites. The particular aromatic amines which demonstrate specific heat stabilizing capabilities include: primary polyamines, diarylamines, bisdiarylamines, alkylated diarylamines, ketone-diarylamines condensation products, aldehyde-amine condensation products, and aldehyde imines. Conditions which would be considered severe in the practice of this invention would be those in which the thermoformed, heat set article would be exposed to temperatures near 200° C. for a period exceeding 30 minutes. Preferred heat stabilizers for such severe high temperature applications particularly where any staining or discoloration from the heat stabilizer is undesirable are the polyphenols which have more than two phenol ring structures in the compound. Polyphenols which are useful include, but are not limited to:

tetrakis(methylene 3-(3,5-ditertiary butyl-4-hydroxyphenyl)-propionate) methane, and 1,3,5-trimethyl-2,4,6-tris(3,5-ditertiary butyl-4-hydroxybenzyl)benzene.

With regard to the level of heat stabilizer added, persons skilled in the art will be able to easily determine the effective amount needed, with this amount generally ranging from about 0.005 to about 2 percent by weight based on the total weight of the composition. Normally it will be preferred for from about 0.01 to about 0.5 percent by weight, based upon the total weight of the composition, of the heat stabilizer to be present. The particular level used is left to the discretion of the practioner in light of factors such as degree of protection required, the severity of heat exposure, any solubility limitation of the chosen heat stabilizer in the polyethylene terephthalate/polyolefin blend being utilized.

One or more non-nucleating colorants can also be added to the PET/polyolefin blend. Colorants which are useful in the practice of this invention include organic colorants which do not act as nucleating agents. Some representative examples of some non-nucleating organic colorants include: phthalocyanine blue, solvent red 135, and disperse yellow 64 (CAS No. 10319-14-9). Other dyes in the solvent and disperse groups are useful colorants for the invention as well. To determine whether a particular colorant is non-nucleating, a differential scanning colorimeter curve is generated. The crystallization peaks are compared for the PET/polyolefin with colorant added and without any colorant allowing for reasonable experimental error, the following characteristics should remain substantially equal: (1) crystallization onset time, (2) temperature at maximum crystallization rate, (3) change in enthalpy. The amount of organic colorant or combination of organic colorants needed to obtain a specific desired color can be easily ascertained by persons skilled in the art.

The articles of manufacture to which this invention relates are thin-walled thermoformed polyester articles. Thin-walled as used herein means articles having wall thickness less than 1 millimeter. An article having a wall thickness greater than 1 millimeter (40 mils) could be made using this invention with its thermoforming techniques only if the preformed sheet could be preheated to a suitable thermoforming temperature while maintaining the substantially amorphous state of the sheet. However, currently available methods of preheating the sheet do not uniformly distribute heat quickly enough to minimize crystallinity increase prior to forming when the parts have wall thickness greater than 1 millimeter.

Since a partially crystalline finished article is necessary for good dimensional stability at high temperature, knowledge of the degree of crystallinity or percent of crystallinity is of considerable importance. Density is a convenient method of measuring percent of crystallinity since there is a direct relationship between the two for a given polyester composition. A calibrated gradient column is used for determining density at a particular temperature. The density value is converted to a percent of crystallinity.

The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms. The crystallization temperature or crystallization onset can be visually observed as the point at which a substantially amorphous, unoriented sheet of PET/polyolefin changes from a transluant, hazy appearance to a white appearance.

As used throughout this specification and the appended claims, the term glass transition temperature means that temperature or temperature range at which a change in slope appears in the volume versus temperature curve for said polymer and defining a temperature region below which the polymer exhibits a glassy characteristic and above which the polymer exhibits a rubbery characteristic. The glass transition temperature (Tg) of polyethylene terephthalate in various states has been reported as follows:

| | |
|---|---|
| Amorphous | 67° C. |
| Crystalline | 81° C. |
| Oriented and Crystalline | 125° C. |

Another aspect of this invention relates to a process for producing heat set, thin-walled articles from suitable polyester compositions as described above using conventional thermoforming equipment. The complete technique consists of the following steps:

1. Forming a substantially amorphous sheet from the homogeneously blended PET/polyolefin composition.
2. Preheating the sheet until it softens and positioning it over the mold.
3. Drawing the preheated sheet onto the heated mold surface.
4. Heatsetting the formed sheet by maintaining sheet contact against the heated mold for a sufficient time period to partially crystallize the sheet.
5. Stripping the part out of the mold cavity.

The sheeting and film for use in the thermoforming process can be made by any conventional method. The most common method being by extrusion through a flat die. It is important that the sheet or film be quenched immediately after extrusion in order to minimize the extent of crystallization developed after forming.

The term substantially amorphous as used herein shall mean a sheet having a level of crystallinity low enough to enable thermoforming of the sheet to be accomplished with satisfactory mold definition and part formation. In currently available thermoforming processes, the level of crystallinity of the preformed sheet should not exceed 10 percent.

The preheating of the substantially amorphous sheet prior to positioning over the thermoforming mold is necessary in order to achieve the very short molding times required for a viable commercial process. The sheet must be heated above its Tg and below the point at which it sags excessively during positioning over the mold cavity. The preferred range is 120°-160° C., most preferably 135°-150° C.

This invention can be practiced by using any of the known thermoforming methods including vacuum assist, air assist, mechanical plug assist or matched mold. The mold should be preheated to a temperature sufficient to achieve the degree of crystallinity desired. Selection of optimum mold temperature is dependent upon type of thermoforming equipment, configuration and wall thickness of article being molded and other factors. The operable range of mold temperatures is 150°-215° C. The preferred range is 170°-190° C.

Heatsetting is a term describing the process of thermally inducing partial crystallization of a polyester article without appreciable orientation being present. In the practice of this invention, heatsetting is achieved by maintaining intimate contact of the film or sheet with the heated mold surface for a sufficient time to achieve a level of crystallinity which gives adequate physical properties to the finished part. It has been found that desirable levels of crystallinity should be about 10 to about 40 percent. For containers to be used in high temperature food application it was found that levels of crystallinity above 15 percent were necessary for adequate dimensional stability during demolding operations. A preferred range of crystallinity is from 20 to 35 percent, this range yields parts with excellent dimensional stability and impact resistance.

The heat set part can be stripped out of the mold cavity by known means for removal. One method, blow back, involves breaking the vacuum established between the mold and the formed sheet by the introduction of compressed air. In commercial thermoforming operation the part is subsequently trimmed and the scrap ground and recycled.

In the preparation of films or sheeting for subsequent use in thermoforming processes, it is extremely important that the polyolefin be homogeneously dispersed with the PET to form a homogeneous blend in order to achieve optimum results. The polyolefin may be added during the polymerization of the polyethylene terephthalate. The polyolefin is carried through the reaction as an inert material and is homogeneously mixed with the PET. A preferred method of achieving a homogeneous blend is mechanically blending the particulate PET and polyolefin prior to introduction into the film extruder. It is also preferred for the heat stabilizer to be blended into the polyolefin before it is mixed with the PET. An alternative method involves the preliminary step of masterbatching approximately one quarter by weight polyolefin with approximately three quarters of PET. This blend is melt extruded, pelletized and dried for subsequent addition to additional quantities of PET to achieve the desired percentage blend of the polyolefin with the PET. The film can be produced by conventional extrusion or casting methods. Depending upon the method employed in making the film or sheeting, the I.V. of the film or sheeting produced may be nearly the same or slightly lower than the I.V. of the starting PET resin. The thermoformed articles have the same I.V. as the film or sheeting.

All of the following examples utilize polyethylene terephthalate (PET) resin which has an intrinsic viscosity (I.V.) of 1.04 as measured in a 60/40 by volume mixed solvent of phenol/tetrachloroethane at 30° C. The above described masterbatch method was utilized for preparation of the homogeneous blend of polyolefin with the PET prior to extrusion. All sheeting was made by extruding onto a chilled casting roll. The intrinsic viscosities of the finished sheeting ranged from 0.85 to 0.92, unless otherwise noted.

Throughout the specification and appended claims, all percent expressions are weight percent based on the total weight of the composition, polymer, sheet or article. The following examples are intended to be illustrative of the invention rather than limiting its scope.

EXAMPLES 1 THROUGH 6

An unmodified polyethylene terephthalate having an intrinsic viscosity of 1.04 was compared with the same polyethylene terephthalate resin modified with various polyolefins. The modified PET compositions were prepared by first making a masterbatch in the following manner; (1) Mechanically blending particulate pellets of PET with 23 weight percent of the desired polyolefin; (2) Melt blending in a 2 inch laboratory extruder; (3) Pelletizing; (4) Drying the pelletized blend to below 0.005 percent water. A 1.75 inch, single screw film extruder was then fed simutaneously with the masterbatch and predried PET in correct amounts to achieve the desired finished ratio of PET/polyolefin. The film extruder was fitted with a flat die to make a 0.38 millimeter sheet which was extruded directly onto a chilled casting roll for quenching. Each composition was then evaluated in a series of experiments in which thermoforming articles were produced on a Comet Labmaster Thermoformer in which a female mold was secured having the configuration commonly seen for use as small frozen pot pie dishes. The mold was a tapered circular open dish having a 10.80 centimeter diameter measured across the open top edge tapering to 8.28 centimeters measured across the flat bottom with a vertical depth of 2.86 centimeters. Each individual experiment consisted of heating the preformed sheet to a prescribed temperature then positioning the sheet over the mold cavity and subsequently drawing the sheet into intimate contact with the mold surface by the use of vacuum assist. Contact with the mold surface heated to 160° C. was maintained for five seconds to achieve heatsetting of the composition. It was then manually stripped from the mold and subsequently trimmed for testing. Each composition was tested in a series of experiments in which the sheet was preheated to successively higher temperatures within the range of 120° C. to 158° C. This procedure allowed evaluation of the range of temperature in which an adequate thermoformed part may be made from each composition. The following polyolefins were utilized in all examples hereinafter and are referred to in experimental results by the designations in the first column below:

| Polyolefin | Identification | Melt Index Astm D1238 | Density, g/cc |
|---|---|---|---|
| LLDPE | Dowlex 2045 (Dow Chemical) linear low density polyethylene | 1.0 | 0.920 |
| LLDPE-6 | Dowlex 2035 (Dow Chemical) linear low density polyethylene | 6.0 | 0.919 |
| LDPE | Dowlex 594 (Dow Chemical) low density polyethylene | 1.5 | 0.925 |
| HDPE | Dowlex 7065 (Dow Chemical) high density polyethylene | 0.7 | 0.965 |
| PP | Pro Fax SA861 (Hercules, Inc.) polypropylene | 8.0 | 0.900 |

The following experimental observations were made for each tested composition.

1. Crystallization onset. The film temperature at which the first appearance of crystallinity occurred in the formed sheet during preheating.

2. Forming range. This is the range of film temperatures in which the thermoformed part will form as desired. Below this range, blisters and cold drawing occurs; above this range the part formation is incomplete.

3. Impact resistance. Measured on the formed article by inverting the dish and striking the point of interface between the bottom of the dish and the side which is the weakest portion of the test container. Cracking upon impact indicated a brittle character in the formed part.

4. Mold release. The manner in which the thermoformed part released from the mold as the mold was retracted. The rating evaluates the tendency of the part to stick to the mold.

The series of experiments yielded the following results:

TABLE I

| EXAMPLE | POLYOLEFIN MODIFIER | CRYSTALLIZATION ONSET, °C. | FORMING RANGE, °C. | IMPACT RESISTANCE | MOLD RELEASE |
|---|---|---|---|---|---|
| 1 | None added | 149 | 147–152 | Cracked | Slight sticking |
| 2 | 3% LLDPE-6 | 140 | 132–145 | No cracks | Good |
| 3 | 3% LLDPE | 141 | 138–146 | No cracks | Good |
| 4 | 3% LDPE | 140 | 134–146 | No cracks | Good |
| 5 | 3% HDPE | 141 | 133–145 | No cracks | Good |
| 6 | 3% PP | 146 | 141–152 | No cracks | Good |

Examination of the data above shows the following improvements which the practice of this invention yields over unmodified PET:

1. Improved toughness and impact resistance as evidenced by the lack of cracking on impact of the modified compositions 2 through 6 compared to the unmodified composition 1.

2. Improved mold release characteristics. All polyolefin modified compositions showed good ratings on mold release which leads to fewer rejects during a commercial thermoforming operation either from deformation of parts during demolding or for poor surface qualities of the parts.

3. A broader forming range was found for all modified compositions. The broader forming range leads to a thermoforming process which is less sensitive to small changes in the temperature of the preheated sheet. This is a major benefit for high speed industrial thermoforming lines.

4. Compositions 2, 3, 4 and 5 all of which are polyethylene modified PET materials exhibited significantly lower crystallization onset temperatures which means that the sheet can be preheated to a lower temperature thus allowing shorter cycle times.

EXAMPLES 7 THROUGH 12

Isothermal crystallization experiments were conducted using a constant temperature silicone oil bath maintained at 140° C.. Film samples 0.38 millimeters thick (15 mils) of various polyester compositions were prepared as described in Examples 1–6. The samples were immersed in the bath. At given time intervals, the crystallization was stopped by withdrawing the samples and quenching them in ice water. The density of each sample was measured using a calibrated gradient column. Since there is a direct linear relationship between density and crystallinity, either density or crystallinity may be plotted versus time.

From the density verses time graphs for the crystallization isotherm at 140° C., the following parameters can be derived:

1. Induction period. Time to the initiation of crystallization as indicated by increasing density values.

2. Halftime of primary crystallization. Time to the mid-point of the total change in degree of crystallinity or density.

The results of the isothermal crystallization studies comparing unmodified PET with polyolefin modified PET are presented below in Table II:

TABLE II

| EXAMPLE | POLYOLEFIN MODIFIER | INDUCTION PERIOD, SEC | HALF TIME OF CRYSTALLIZATION, SEC |
|---|---|---|---|
| 7 | None | 22 | 26.5 |
| 8 | 3% LLDPE-6 | 6 | 10.5 |
| 9 | 3% LLDPE | 10.5 | 17.0 |
| 10 | 3% LDPE | 15 | 20.0 |
| 11 | 3% HDPE | 7.5 | 16.0 |
| 12 | 3% PP | 19 | 24.0 |

As can be seen in the foregoing results of the isothermal crystallization studies, the polyolefin modified compositions exhibited shorter induction periods indicating that crystallization begins much more rapidly when the composition modified with polyolefin is subjected to heats sufficient to begin thermal crystallinization. The polyolefin modified compositions also showed reduced halftime of crystallization when compared to unmodified PET. These studies show that the polyolefin modifiers lead to improved rates of crystallization. The improved rate of crystallization translates in a commercial thermoforming process to substantially reduced cycle times in the production of articles. The reduced cycle times are possible since the desired level of crystallinity can be achieved in a shorter period of contact with the hot mold. These crystallization rate studies bear out the results described in Examples 1–6 which used the same compositions and showed that the modified compositions had superior processing properties in the actual thermoforming of containers.

EXAMPLES 13 THROUGH 17

A series of experiments were run to evaluate the effect of progressively higher levels of linear low density polyethylene (Melt Index 1.0) as an additive with the PET. The same procedure as in Examples 1 through 6 was used in preparation of the composition, producing the sheeting, and thermoforming the finished test specimens. The sheeting used for Examples 15 and 20 had an I.V. of 0.79. Table III summarizes the experimental results:

TABLE III

| EXAMPLE | POLYOLEFIN MODIFIER | CRYSTALLIZATION ONSET, °C. | FORMING RANGE, °C. | IMPACT RESISTANCE | MOLD RELEASE |
|---|---|---|---|---|---|
| 13 | None added | 149 | 147–152 | Cracked | Slight sticking |
| 14 | 1% LLDPE | 143 | 138–147 | Cracked | Good |
| 15 | 2% LLDPE | 141 | 134–143 | No cracks | Good |
| 16 | 3% LLDPE | 141 | 138–146 | No cracks | Good |
| 17 | 10% LLDPE | 141 | 138–145 | No cracks | Good |

The results above show that there is an initial improvement in the crystallization onset temperature and forming range with the addition of as little as 1% of linear low density polyethylene. There is slight further improvement with the two and three percent levels of modifier, but little improvement in thermoforming properties are noted between 3 and 10 percent. For this reason it was determined that the 3% addition level of linear low density polyethylene yielded a product which was distinctly better than the PET control in thermoforming.

EXAMPLES 18 THROUGH 22

A series of experiments were conducted to evaluate the rate of crystalline growth with progressively higher levels of linear low density polyethylene. The technique employed was isothermal crystallization study using sample preparation and test methods identical to those described in Examples 7 through 12. A control composition of unmodified PET resin was utilized for comparison purposes. The induction period and the halftime of crystallization were determined from the experimental data for the control, 1%, 2%, 3%, and 10% levels of linear low density polyethylene in PET. Table IV summaries the experimental results:

TABLE IV

| EXAMPLE | POLYOLEFIN MODIFIER | INDUCTION PERIOD, SEC | HALF TIME OF CRYSTAL-LIZATION, SEC |
|---|---|---|---|
| 18 | None added | 22 | 26.5 |
| 19 | 1% LLDPE | 15 | 22.0 |
| 20 | 2% LLDPE | 11.5 | 18.5 |
| 21 | 3% LLDPE | 10.5 | 17.0 |
| 22 | 10% LLDPE | 12 | 17.5 |

The experimental results above show that the induction period becomes generally shorter with increasing levels of linear low density polyethylene. It is noted that the 10% level of modifier showed a slight increase in the induction period, this was generally attributed to difficulties in getting an adequate dispersion with the PET which would contribute to variable results. The halftime of crystallinity showed a decreasing value with increasing levels of modifier. Again the 10% level showed a slight increase rather than a decrease as would be expected compared to the 3% level. This was again attributed to difficulty in obtaining an adequate dispersion with the PET. The results of this crystallization rate study correspond well with the improvements noted in the series of similar compositions run in Examples 13 through 17 in an actual thermoforming trial.

EXAMPLES 23 THROUGH 26

Alternative methods of incorporating the polyolefin modifier were evaluated by preparing two compositions both having three weight percent linear low density polyethylene with 97% PET. One composition (3% LLDPE compounded), used in Examples 23 and 25, was prepared and formed into sheeting in the manner described in Examples 1 through 6. The second composition, identified as 3% LLDPE reactor in Examples 24 and 26, was prepared by introducing LLDPE during the polymerization of the PET. The polyethylene terephthalate was produced in the conventional manner involving an esterification stage and a subsequent condensation stage. The preparation of the polyester prepolymer occurs in the esterification stage by the reaction of ethylene glycol with terephthalate acid. In this experiment the linear low density polyethylene was added to the prepolymer in the second stage, the condensation stage, where the low molecular weight polyester prepolymer is further polymerized to the desired high molecular weight product. The resulting product was pelletized, dried and subsequently formed into a 0.38 millimeter sheet by using the film extruder and extruding the sheet onto a chilled casting roll in the same manner as all other sheeting was prepared as described in Examples 1–6.

Isothermal crystallization studies were also conducted as described in Examples 7 through 12. The results of the studies are summarized in Table V. The sheeting produced from the two compositions was tested in thermoforming trials as described in Examples 1 through 6. The results are summaried in Table VI.

TABLE V

| EXAMPLE | POLYOLEFIN MODIFIER | INDUCTION PERIOD, SEC | HALF TIME OF CRYSTAL-LIZATION, SEC |
|---|---|---|---|
| 23 | 3% LLDPE compounded | 10.5 | 17.0 |
| 24 | 3% LLDPE reactor | 12.5 | 20.0 |

TABLE VI

| EXAMPLE | POLYOLEFIN MODIFIER | CRYSTALLIZATION ONSET, °C. | FORMING RANGE, °C. | IMPACT RESISTANCE | MOLD RELEASE |
|---|---|---|---|---|---|
| 25 | 3% LLDPE (compound) | 141 | 138–146 | No cracks | Good |
| 26 | 3% LLDPE (reactor) | 141 | 137–145 | No cracks | Good |

As can be seen in the thermoforming results above the crystallization onset, forming range, impact resistance, and mold release properties of the thermoformed dish were the same for the two compositions which were prepared by the different methods.

EXAMPLES 27 THROUGH 29

A test series was devised to simulate long term, high temperature exposure of a finished article during service life. Three test materials were prepared, a control consisting of PET having a 1.04 IV, the same PET modified with 3 percent linear low density polyethylene and the third test material was PET with 3 percent linear low density having incorporated therein 0.1 weight percent of 1,3,5-trimethyl-2,4,6-tris (3,5 ditertiarybutyl-4 hydroxybenzyl)benzene, as a heat stabilizer. Film sheeting of 0.38 millimeter thickness was prepared by the method described in Examples 1 through 6. Rectangular test specimens, 12.7 millimeters by about 150 millimeters, were cut from the prepared film sheeting.

Samples of the test specimens of each composition were placed in an circulating air oven which was held at 200° C. Sample specimens of each composition were removed at 30 minute intervals up to 120 minutes for subsequent testing. An Instron-Floor Model Tester was used in accordance to ASTM D638.80, appendix A to determine the tensile energy to the breaking point for each sample. The test samples were placed in the gripping jaws which were spaced 50.8 millimeters apart at the start. The jaws were then separated at a rate of 50.8 millimeters per minute. Five individual test samples for each composition at each time interval were averaged to obtain the values set forth in Table VII below. The values indicate the total energy expended to reach the breaking point for each tested specimen.

TABLE VII
TOTAL ENERGY TO BREAK IN N/m × $10^{-2}$
OVEN EXPOSURE TIME at 200° C.

| EXAMPLE | COMPOSITION | 0 Min. | 30 Min. | 60 Min. | 90 Min. | 120 Min. |
|---|---|---|---|---|---|---|
| 27 | PET | 11.8 | 10.4 | 4.5 | 0.9 | 0.8 |
| 28 | PET/LLDPE | 12.2 | 7.9 | 4.4 | 3.8 | 2.5 |
| 29 | PET/LLDPE/STABILIZER | 11.9 | 11.7 | 14.1 | 11.9 | 13.1 |

Table VII shows that unprotected PET, Example 27, begins to loose physical strength after only 30 minutes of exposure at 200° C. The PET plus 3 percent linear low density polyethylene, Example 28, shows a similar rapid decline in physical properties beginning during the 30 minute exposure period. By the end of only 60 minutes of exposure the energy to break was only 36 percent of the initial control value. The PET plus 3 percent linear low density plus heat stabilizer, Example 29, shows retention of original physical properties through the whole test period concluding after 120 minutes. In applications such as dual ovenable trays, protection as demonstrated in this set of examples would be necessary to assure integrity of the composition after long term oven exposure at temperature near 200° C. Protection of the composition by the addition of an appropriate heat stabilizer would be important in any application where high temperature exposure can be expected in service.

EXAMPLES 30 THROUGH 33

The effectiveness of an additional nucleating agent was evaluated in a series of thermoforming and isothermal crystallization studies conducted with compositions of PET having an IV of 1.04 with 3 percent by weight of linear low density polyethylene, 0.1 weight percent of the heat stabilizer used in Example 29 above. One composition, utilized in Examples 30 and 32, contained no nucleating agent. The second composition utilized in Examples 31 and 33, also contained 0.2 weight percent of a fused silicone dioxide having an average particle size of 3 microns which served as a nucleating agent. Sheeting was produced by the method described in Examples 1 through 6 and subsequent thermoforming trials were conducted as described in Examples 1 through 6. The results of these trials are set forth below in Table VIII. Isothermal crystallization studies were conducted in accordance with the procedures described in Examples 7 through 12 with the results set forth below in Table IX.

TABLE VIII
ISOTHERMAL CRYSTALLIZATION AT 140° C.

| EXAMPLE | COMPOSITION | INDUCTION PERIOD, SEC. | HALF TIME OF CRYSTALLIZATION, SEC. |
|---|---|---|---|
| 30 | No nucleating agent | 15 | 20.5 |
| 31 | 0.2% nucleating agent | 14 | 20.0 |

TABLE IX
THERMOFORMING CHARACTERISTICS

| EXAMPLE | COMPOSITION | CRYSTALLIZATION ONSET, °C. | FORMING RANGE, °C. | IMPACT RESISTANCE | MOLD RELEASE |
|---|---|---|---|---|---|
| 32 | No nucleating agent | 141 | 134–143 | No cracks | Good |
| 33 | 0.2% nucleating agent | 140 | 137–143 | No cracks | Good |

The results of the thermoforming trial described in Table VIII unexpectedly showed that the nucleating agent was unnecessary for the achievement of crystallization onset at a low temperature, a broad forming temperature range, good impact resistance and mold release. The isothermal crystallization studies described in Table IX confirm that the nucleating agent is unnecessary.

EXAMPLE 34

The effect of adding 3 percent of poly-4-methyl pentene was investigated by conducting an experiment comparing a control composition of 100 percent PET having a 1.04 IV against a composition of the same PET with 3 percent of polymethylpentene. The polymethylpentene employed was RT-18 produced by Micsui Petrochem, melt index 26.0 when using ASTM D1238, density 0.835 g/cc. Material was prepared and thermoforming trials conducted in conformity with the procedures described in Examples 1 through 6. Isothermal crystallization studies were conducted in accordance with the procedures described in Examples 7 through 13. The result of these experiments showed that polymethylpentene showed improvement in thermoforming with regard to broadened forming range, improved impact resistance, and improved mold-release versus the control PET. The polymethylpentene, in contrast to the other polyolefins evaluated, showed a longer induction period by 3 seconds and a 1 second longer halftime of crystallinity in the isothermal crystallization studies when compared to the control PET. The onset of the crystallization point was similarly higher by 5 degrees in the thermoforming which is consistent with the isothermal crystallization data. The addition of polymethylpentene gives improved impact properties to the finished part and improved mold release and broadened forming range in thermoforming process, however, the cycle time would be predicted to be slightly higher than with the polyethylene and polypropylene modifiers.

What is claimed is:
1. A thermoformed, non-oriented, heat set, thin wall article, the composition consisting of:
   (A) from about 99 to about 90 weight percent of polyethylene terephthalate with an intrinsic viscosity as measured in a 60/40 by volume mixed solvent of phenol/tetrachloroethane at 30° C. from about 0.65 to about 1.2: and

(B) from about 1 to about 10 weight percent of a polyolefin with repeat units derived from olefin monomers containing 2 to 6 carbon atoms; and (C) an effective amount of a heat stabilizer; said article having a total crystallinity of from about 10 to about 40%.

2. An article as described in claim 1 wherein said polyolefin is selected from the group consisting of polyethylene and polypropylene.

3. An article as described in claim 2 wherein from about 0.005 to about 2.0 weight percent of said heat stabilizer is present in said composition.

4. An article as described in claim 3 wherein said heat stabilizer is a polyphenol selected from the group consisting of 1,3,5-Trimethyl-2,4,6-tris(3,5-di-t butyl-4-hydroxybenzyl)benzene, and tetrakis(methylene3-(3,5-ditertiary butyl-4-hydroxyphenyl)-propionate)methane.

5. An article as described in claim 4 wherein from about 0.01 to about 0.5 weight percent of said heat stabilizer is present in said composition.

6. An article as specified in claim 5 wherein said polyolefin in polyethylene.

7. An article as specified in claim 6 wherein said article is a food container.

8. An article as specified in claim 7 wherein said polyolefin is linear low density polyethylene.

9. A thermoformed, non-oriented, heat set, thin walled article, the composition consisting of:

(A) from about 99 to about 90 weight percent of polyethylene terephthalate with an intrinsic viscosity as measured in a 60/40 by volume mixed solvent of phenol/tetrachloroethane at 30° C. from about 0.65 to about 1.2;

(B) from about 1 to about 10 weight percent of a polyolefin with repeat units derived from olefin monomers containing 2 to 6 carbon atoms;

(C) an effective amount of a heat stabilizer; and (D) at least one non-nucleating colorant; said article having a total crystallinity of from about 10 to about 40%.

10. An article as described in claim 9 wherein said polyolefin is selected from the group consisting of polyethylene and polypropylene.

11. An article as described in claim 10 wherein from about 0.005 to about 2.0 weight percent of said heat stabilizer is present in said composition.

12. An article as specified in claim 9 wherein said non-nucleating colorant is selected from the group consisting of phthalocyanine blue, solvent red 135, and dispersed yellow 64 (CAS No. 10319-14-9).

13. An article as specified in claim 12 wherein said polyolefin is polyethylene.

14. An article as specified in claim 13 wherein said heat stabilizer is a polyphenol selected from the group consisting of 1,3,5-Trimethyl-2,4,6-tris (3,5-di-t-butyl-4-hydroxybenzyl)benzene, and 3-(3,5-ditertiary butyl-4-hydroxyphenyl)-propionate)-methane.

15. An article as described in claim 14 wherein from about 0.01 to about 0.5 weight percent of said heat stabilizer is present in said composition.

16. An article as described in claim 15 wherein said article is a food container.

17. An article as specified in claim 16 wherein said polyolefin is linear low density polyethylene.

* * * * *